June 20, 1967     G. J. MARTIN     3,326,313
ADJUSTMENT MEANS FOR THE PIVOT BEARINGS OF
STEERABLE DRIVE WHEELS
Filed June 9, 1966     2 Sheets-Sheet 2
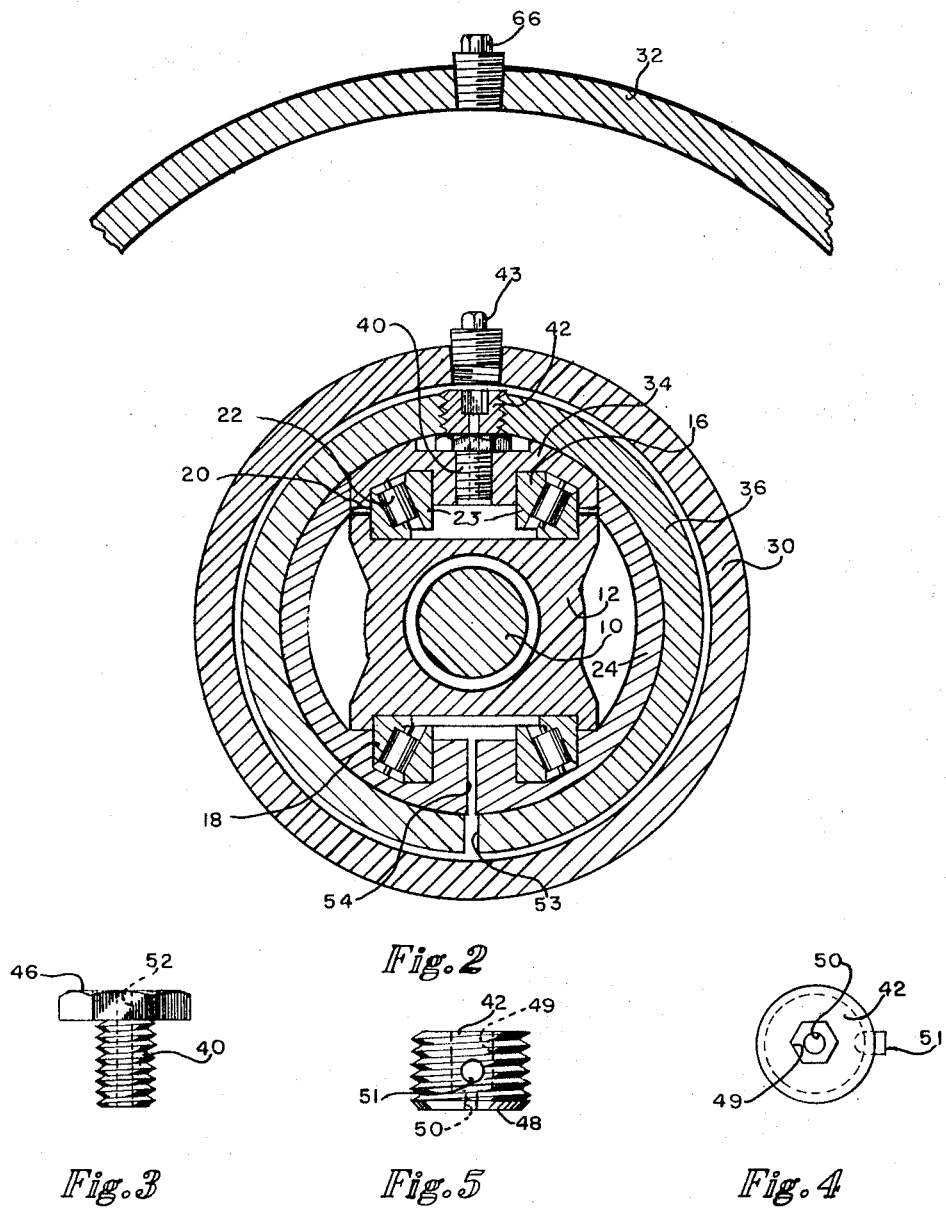
INVENTOR.
*George J. Martin*
BY
*Richard D. Law*
ATTORNEY United States Patent Office 3,326,313
Patented June 20, 1967

3,326,313
ADJUSTMENT MEANS FOR THE PIVOT BEARINGS OF STEERABLE DRIVE WHEELS
George J. Martin, Denver, Colo., assignor to The American-Coleman Company, Littleton, Colo., a corporation of Nebraska
Filed June 9, 1966, Ser. No. 556,357
5 Claims. (Cl. 180—48)

ABSTRACT OF THE DISCLOSURE

An adjustment for the bearings of a steerable drive wheel is provided by a set screw threaded in a retainer ring for upper and lower wheel bearings, so that the bearings are moved toward and away from each other by the set screw. A bearing cap is mounted between the upper bearing and the set screw to provide the adjustment on the upper and lower bearing set. The set screw is easily accessible through a closable hole in the wheel hub, making adjustment possible from the outside of the wheel. This permits quick and easy field adjustment.

---

This invention relates to improvements in steerable drive wheel mountings and the adjustment for the pivotal bearings thereof.

Steerable drive wheels, particularly four-wheel drive vehicles, have been extensively used for heavy duty cargo carriers as well as heavy duty construction vehicles which are mounted on rubber tires. Steerable drive wheels for pleasure-type vehicles are currently used with increasing frequency. Some vehicles have steerable rear drive wheels, particularly on large, heavy vehicles where mobility of the vehicle is of prime importance.

Steerable drive wheels, whether front or rear, are normally of necessity complicated in their construction and the structures are generally quite massive to be strong enough for loads and stresses they sustain in operation, to enclose the functional components for the power drive, and provide sufficient steering movement. The structures must usually include suitable braking means and all of the parts must be incorporated into a unitized component enclosed within a rim or near the wheels.

Maintenance of steerable drive wheels has not been heretofore easily accomplished, particularly by users in the field without proper equipment for the disassembly of the steerable drive wheel unit. Previously, the alignment and adjustment of the pivot bearings, which are associated with the steerable mountings, has been accomplished by a clamp ring and a tapered wedge, or a pivot bearing cup which is adjusted by means of a bolt accessible from the inner side of the wheel, one example of such is U.S. Patent No. 2,346,842. Other systems for adjusting the pivot bearing include a plurality of tapered wedges, individually adjustable by set screws. Most of these arrangements only difficultly provide for individual adjustment of the pivot bearings, and usually on only one side of the pivot bearings, thus causing a problem of wheel mount concentricity.

According to my present invention, I provide a single vertical adjustment, which is easily accomplished by a single wrench in a single adjustment position. This system provides means for keeping both bearings in proper adjustment. The adjustment system is easily accessible by removing the wheel of the vehicle, removing the outer covering of the steerable drive wheel hub, thereby exposing the opening for the adjustment wrench. The removal of the wheel and the hub is very easily accomplished either in the shop or in the field. The adjustment of the bearing is done by means of an Allen wrench or similar bar-type tool, depending upon the configuration of the adjusting screw. Since most maintenance of a steerable drive wheel requires removal of the wheel and the hub cover, the adjustment of the pivot bearings may be considered a part of the standard maintenance procedure.

It is, therefore, among the objects and advantages of my invention to provide a simplified means for pivotal bearing adjustment for a steerable drive wheel.

A further object of the invention is to provide a housing for the steering mechanism of the steering drive wheel which is completely enclosed and arranged to operate in a bath of oil or grease.

These and other objects and advantages of the invention may be readily apparent from the following description and appended illustrations in which:

FIG. 2 is a cross-section of a portion of the steerable drive wheel of FIG. 1, taken along section lines 2—2;

FIG. 3 is a plan view of a bearing screw for use in the adjustment of pivot bearings of a steerable drive wheel;

FIG. 4 is a plan view of a self-locking adjustment screw for use in the adjustment of pivot bearings of a steerable drive wheel; and FIG. 5 is a side elevational view of the device of FIG. 4.

Figure 1:
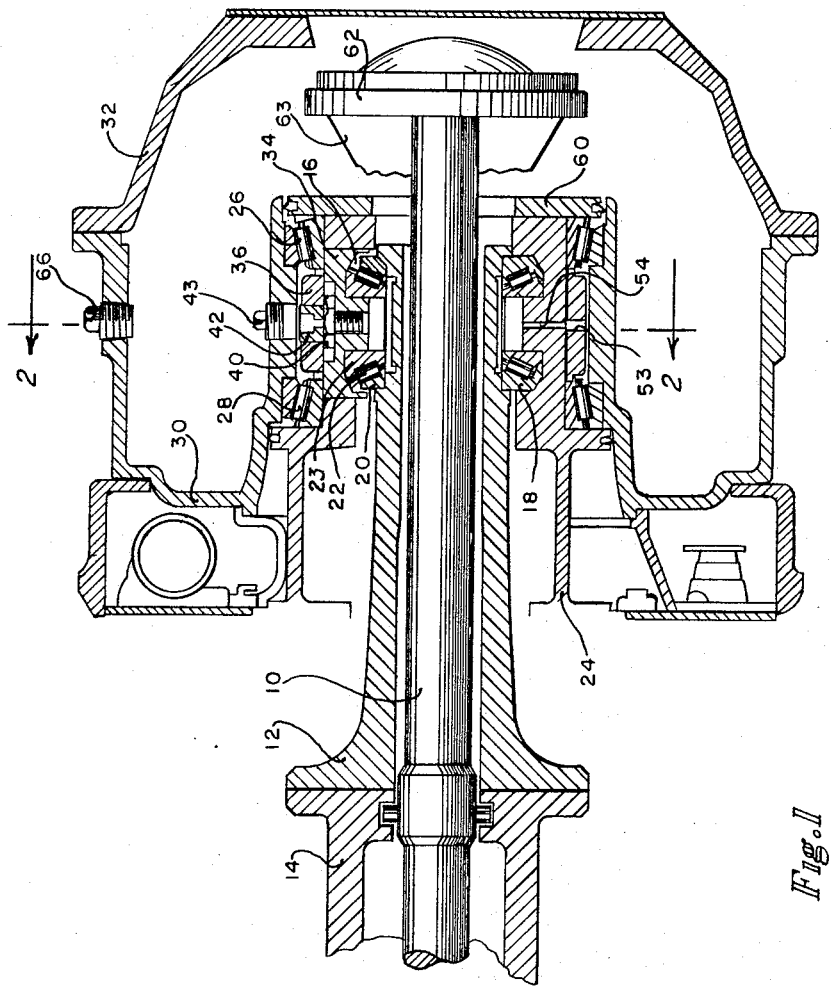
FIG. 1 is a partial cross-sectional view of a steerable drive wheel showing the positioning of the pivot bearings and the adjustment thereof.

In the device illustrated in the drawings, an axle shaft 10 is mounted in a stub 12 which is arranged to be secured to an axle housing 14, which is only partially shown in FIG. 1. The axle 10 is a rigid axle and it is arranged to be connected to a differential, not shown, for driving the steerable wheel in a manner similar to the above-identified U.S. patent. An upper pivot bearing set 16 and a lower pivot bearing set 18 mounted adjacent the end of the stub 12 provide pivotal movement of a hub on which a wheel is mounted. As identified for FIG. 1, each bearing set includes a bearing cup 20 and a plurality of rollers or other suitable bearings 22 and cone 23 providing free pivotal movement of the hub and an attached wheel. A spindle assembly 24 is mounted on the pivotal bearings, and the spindle is arranged to pivot on the bearings, such a spindle is described in U.S. Patent No. 3,078,943, having a common assignee of the present application. Mounted around the end of the spindle assembly is a radial bearing set 26 and 28 which provides for free rotation of a hub assembly 30. A hub cover 32 is removably attached to the hub assembly 30 by bolts (not shown) and provides means for access to the pivotal and drive assemblies of the steerable drive wheel. A rim and tire may be attached to the hub in accordance with standard practice by lugs and the like, which are not shown, but are conventional in the art.

The lower pivot bearings 18 are mounted in a recess in the spindle assembly and are held on a seat in the stub. The upper bearing assembly 20 is, likewise, seated on a recess on the upper side of the stub and is held in position by means of a cap 34 which is provided with a recess for holding the bearing cone 23. A clamp ring 36 encircles the spindle end and is approximately centered on the cap 34. A bearing screw or loading bolt 40, shown in FIG. 3, is mounted in a threaded opening in the cap to provide a flat bearing surface for adjustment screw. An adjusting screw 42, shown in FIGS. 4 and 5, is threadedly mounted in an opening passing through the clamp ring 36. The loading bolt 40 has an upper surface 46 which is ground smooth and flat to provide a bearing surface for the adjusting screw 42. The adjusting screw 42 is provided with a flat, ground surface 48 on its bottom for seating on the top of the loading bolt 40. The adjusting screw includes a hexagonal opening 49 for accommodating an Allen wrench for adjustment. Of course, other configurations of openings may be provided to accommodate different configurations of bar-type tools. A passage 50 may be formed through the adjusting screw 42 from the opening 49 to provide a lubricant passage through the set screw. Where desired, the loading bolt may, also, have a passage 52 extended therethrough to jointly permit with the passage in the adjusting screw the passing of lubricant from the space between the hub and the spindle into the pivot bearing space. A plastic locking pellet 51 is mounted in a small recess in the side of the adjusting screw, through the threads thereof, providing locking means for the adjusting screw in the clamp ring to hold the same in desired position bearing against the loading bolt 40. A bore 53 in the bottom of the clamp ring and a bore 54 in the spindle provided additional means for passing lubricant into the pivot bearings. When a passage is provided through the loading bolt 40, a small bore must be provided through the spindle housing in the bottom of the threaded opening which holds the loading bolt.

A cover plate 60 is secured by means of bolts or other fastening means (not shown) to the spindle holding the assembly together. A yoke ring 62 mounted on the end of the axle 10 is provided with a yoke 63, a part of which is shown in FIG. 1, which is pivotally attached to a transfer ring, not shown, which is mounted in the space in the hub, according to conventional practices. The transfer ring then is pivotally secured to the hub to provide articulation of the spindle and the hub while the hub is rotating under the influence of the axle. A pipe plug 66 is threadedly mounted in the hub for filling the same with oil or other lubricant. Since the hub is completely enclosed, it may be filled with lubricant for operation of the steering joint submerged in a lubricant.

The adjustment of the bearings is accomplished by removal of the hub cover 32 and the pipe plug 43 which is threadedly mounted in the inner hub ring. The hub is rotated so that the pipe plug opening is moved into an upright position directly above the adjusting screw 42. An Allen wrench, or other wrench capable of fitting in the adjusting screw, is placed in the opening in the adjusting screw and, by turning the same, pressure is exerted between the clamp ring and the cap and stub to either draw up on the pivot bearings or release the pressure on the same. Thus adjustment is easily completed through an acessible opening which is easily lighted. The clamp ring is centered on the pivot bearing so that increased pressure or decreased pressure is vertically on both upper and lower sets, thereby maintaining uniform pressure on each of the bearings of each set.

The adjusting screw or wedge keeps both of the pivot bearings in proper adjustment, however, it is to be noted that the lower bearing, carrying the load, is subject to more wear than the upper pivot bearing. This may be compensated by merely turning the spindle cover to place the pivot bearing cap and the adjustment at the bottom, and each adjustment to compensate for bottom bearing wear would maintain concentricity with the wheel. Also the life of the joint may be increased by reversing the upper and lower bearings as the lower bearing becomes worn. Also, an approximation of normal wear may be made and the bearings initially installed at an eccentricity on one-half of the life wear thereby allowing each adjustment to bring the wheel closer to true concentricity for the first one-half of wear and then past true center for the remainder of the wear. Further, in assembly of the unit it is possible to pre-load the adjusting screw prior to complete assembly, thereby facilitating the assembly, and final adjustment is then easily accomplished. The holes into the bearing permit the bearing to be washed without disassembly for easier maintenance. Very important is the fact that existing inserts may be modified with the present invention. Also, adjustment could be made by removing both pipe plugs (if the top one was larger and a means of locking a socket-type wrench onto the inner lug) and adjusting set screw with a sturdy T-handled wrench.

While the invention has been illustrated by reference to a particular embodiment, there is no intent to limit the spirit or the scope of the invention to the precise details so set forth except as defined in the following claims.

I claim:

1. In a steerable vehicle wheel assembly having an axle housing enclosing an axle, a spindle mounted over an end portion of said housing with the axle passing through said spindle, said spindle being supported on upper and lower pivot bearing means for steering movement about a substantially vertical axis, and a hub for supporting a wheel rotatably mounted around said spindle, the improvement which comprises cap means mounted over the upper pivot bearing means and arranged for limited movement toward and away from said pivot upper bearing means; a clamp ring extending around said spindle encompassing said upper and lower pivot bearing means and said cap means; a load bearing surface connected with said cap means providing a flat planar upper surface; and an adjusting screw threadedly mounted in an opening passing through said clamp ring and bearing against said flat surface for moving said cap means toward and away from said clamp ring to increase or decrease pressure on said upper and lower pivot bearings.

2. The improvement in steerable vehicle wheels according to claim 1 wherein said adjusting screw is of a headless type.

3. The improvement in steerable vehicle wheels according to claim 1 wherein said cap means has a bore therethrough and said clamp ring has a bore therethrough opposite said adjusting screw for passing lubricant to and from the pivot bearings.

4. The improvement in steerable vehicle wheels according to claim 2 wherein said adjusting screw has a recessed tool opening in its top.

5. The improvement in steerable vehicle wheels according to claim 1 wherein said adjusting screw has a planar surface on its bottom for seating on said load bearing surface and connected with said cap.

No references cited.

A. HARRY LEVY, *Primary Examiner.*